United States Patent
Vanhoutte et al.

(10) Patent No.: US 6,773,487 B2
(45) Date of Patent: Aug. 10, 2004

(54) PROCESS FOR REFINING SILVER BULLION WITH GOLD SEPARATION

(75) Inventors: Dirk Vanhoutte, Langdorp (BE); Sybolt Brouwer, Berchem (BE)

(73) Assignee: UMICORE, Brussels (BE)

(*) Notice: Subject to any disclaimer, the term of this patent is extended or adjusted under 35 U.S.C. 154(b) by 110 days.

(21) Appl. No.: 10/182,121

(22) PCT Filed: Jan. 17, 2001

(86) PCT No.: PCT/EP01/00613
§ 371 (c)(1),
(2), (4) Date: Oct. 4, 2002

(87) PCT Pub. No.: WO01/55462
PCT Pub. Date: Aug. 2, 2001

(65) Prior Publication Data
US 2003/0154821 A1 Aug. 21, 2003

(30) Foreign Application Priority Data
Jan. 28, 2000 (EP) .......................................... 00200294

(51) Int. Cl.$^7$ .............................................. C01B 21/48
(52) U.S. Cl. ............................ 75/744; 423/27; 423/34; 423/395
(58) Field of Search ....................... 75/634, 733, 744; 423/23, 27, 34, 395

(56) References Cited

U.S. PATENT DOCUMENTS

| 4,857,107 A | 8/1989 | Davis |
| 5,000,928 A | 3/1991 | White |
| 6,126,720 A | * 10/2000 | Okada et al. ................. 75/714 |

FOREIGN PATENT DOCUMENTS

| DE | 406320 | 11/1924 |
| DE | 406430 | 11/1924 |
| DE | 646087 | 6/1937 |
| DE | 947741 | 8/1956 |
| GB | 1 396 270 | 6/1975 |
| JP | 60224720 | 9/1985 |
| RU | 2 112 062 | 5/1998 |

OTHER PUBLICATIONS

Copy of International Search Report from related PCT/EP01/00613 mailed Jun. 13, 2001, 3 pages.

* cited by examiner

Primary Examiner—Melvyn Andrews
(74) Attorney, Agent, or Firm—Antonelli, Terry, Stout & Kraus, LLP

(57) ABSTRACT

A process is disclosed for refining silver bullion, i.e. raw silver containing generally more than 90% silver besides Se, Pb, Au, Cu and platinum group metals (PGM) as main impurities. The process comprises:

- optionally removing Se as gaseous $SeO_2$ from the molten metallic phase by injecting air, which is preferably $O_2$ enriched, into the metallic phase at a preferred bath temperature of 1000–1100° C.;
- optionally slagging off the Pb by contacting the molten metallic phase with a silica and borax based flux at a preferred bath temperature of 1000–1150° C.;
- granulating the molten metallic phase in water, thereby forming Ag rich granules;
- leaching the Ag rich granules with $HNO_3$ at a temperature above 50° C., preferably in an $O_2$ enriched atmosphere, followed by filtration, thereby separating an Au bearing residue from an Ag rich liquor;
- heating the Ag rich liquor, thereby evaporating $H_2O$ and forming an $AgNO_3$ bearing melt;
- maintaining the $AgNO_3$ bearing melt at a temperature of 220–350° C. for at least 15 minutes, thereby forming a mixture of a purified $AgNO_3$ and of a denitration residue containing essentially all the PGM as oxides;
- separating the purified $AgNO_3$ from the denitration residue.

By this process, the many drawbacks of the classical electrolytic refining of silver are avoided.

15 Claims, No Drawings

PROCESS FOR REFINING SILVER BULLION WITH GOLD SEPARATION

RELATED APPLICATIONS

This application is a U.S. national stage filing of International Application No. PCT/EP01/00613, filed Jan. 17, 2001, which, in turn, claims priority of European Application No. 00200294.7, filed Jan. 28, 2000.

TECHNICAL FIELD

The present invention concerns a process for refining silver bullion. Silver bullion is a raw silver alloy originating amongst others from lead-silver smelting, containing generally more than 90% silver besides Se, Pb, Au, Cu and platinum group metals (PGM) as main impurities. Silver bullion is normally available as large castings.

BACKGROUND

The present state of technology for refining silver bullion alloy is electrolytic refining: after casting anodes, the alloy is electrorefined in an $AgNO_3$—$HNO_3$ electrolyte. The following output streams are hereby produced:

purified Ag obtained as dendrites deposited on a stainless steel cathode sheet, anode slime, containing Au and PGM, which is collected in fabric bags surrounding the anode;

a bleed on the $AgNO_3$—$HNO_3$ electrolyte.

The electrolyte bleed is necessary to prevent the accumulation of impurities which anodically dissolve completely as nitrates, such as Pb and Cu, or partially, such as Pd.

A first method for bleed treatment is the retrieval of the dissolved Ag by cementation with a less noble metal. The impurities such as Pb and Cu remain in the nitrate bearing bleed solution.

A second method for bleed treatment is by denitration, also referred to as the black melt process in Ullmann's Encyclopedia of Industrial Chemistry, 1993, vol.A24, p. 134. In this case, the water is evaporated from the electrolyte, and the anhydrous nitrate melt is heated to at least 170° C. The nitrates of PGM decompose to insoluble oxides. Cu nitrate decomposes partially, to an extent determined by the temperature of the melt. After reaction with water, the oxides are separated from the $AgNO_3$ bearing solution. However, if an excess of Pb and Cu has to be removed from the electrolyte, at least part of the bleed must be treated according to the first method. Here again, the Ag has to be retrieved by cementation, producing an impure Pb bearing nitrate solution.

Both methods thus necessitate a rather elaborate treatment of the bleed whereby nitrate solutions are produced. Their further treatment leads to the discharge of nitrates.

This disadvantage is further exacerbated when higher levels of Pb, Cu or Pd are present in the Ag bullion: a higher amount of impurities has indeed to be evacuated by bleeding a correspondingly larger quantity of electrolyte.

Also, more than approximately 2% Pd in the raw silver leads to problems as Pd then gets embedded in the refined Ag deposit.

Both the electrolytic refining process and the anode slime treatment are inherently slow. Consequently, metals have a long residence time and the inventory of the refining plant is high as are the ensuing financial costs.

The present invention aims at resolving the above mentioned disadvantages. Moreover, the new process produces Ag with a higher purity than the state of the art process.

It should be noted that JP-A-60224720 discloses a process for the recovery of Ag from Cu-electrolysis anode slime. This process presupposes that Cu has been nearly completely removed from the slime and that a crude metallic Ag is produced. This crude Ag is subjected to a melting step with injection of an $O_2$ carrying gas, ensuring the oxidation and removal of impurities. The molten purified Ag is then granulated and the granules are dissolved in $HNO_3$. The obtained solution is cleaned up using a chelating resin, whereupon Ag is recovered from the solution by reduction with hydrazine.

The presupposed removal of Cu is however a complex and lengthy process as it necessitates the chlorination (wet or dry) of the anode slime, followed by the conversion of the chlorides back to their metallic form.

U.S. Pat. No. 5,000,928 describes a process for the preparation of ultra-pure $AgNO_3$. As a first step, crude Ag is dissolved in $HNO_3$. It is disclosed that heating and aerating promotes the dissolution process. Further steps include the addition of an alkaline agent to precipitate impurities and the use of a selective reducing agent to precipitate Ag as a metallic powder. This powder is then again dissolved with $HNO_3$, whereupon ultra-pure $AgNO_3$ is crystallized from the solution.

DETAILED DESCRIPTION OF THE INVENTION

The invention discloses a process for refining silver bullion. The process comprises the steps of leaching the silver bullion with $HNO_3$ at a temperature above 50° C., preferably in an $O_2$ enriched atmosphere, followed by filtration, thereby separating an Au bearing residue from an Ag rich liquor;

heating the Ag rich liquor, thereby evaporating $H_2O$ and forming an $AgNO_3$ bearing melt;

maintaining the $AgNO_3$ bearing melt at a temperature of 300–350° C. for at least 15 minutes, thereby forming a mixture of a purified $AgNO_3$ and of a denitration residue containing essentially all the Cu and PGM as oxides;

separating the purified $AgNO_3$ from the denitration residue, either by filtrating the mixture at a temperature above 220° C., thereby obtaining a purified molten $AgNO_3$;

or by reacting the mixture with water, followed by filtration, thereby obtaining a purified $AgNO_3$ solution.

The leaching operation can be greatly accelerated and thus rendered more economical if performed on granules instead of on large castings. To this end the leaching step can be preceded by the following steps:

heating the silver bullion, thereby forming a bath with a molten metallic phase;

granulating the molten metallic phase in water, thereby forming Ag rich granules;

and the leaching step is performed on the Ag rich granules.

It is useful to take advantage of the above melting operation, which is needed for the granulation, to remove Se and Pb from the molten metallic phase. Se can be completely removed as gaseous $SeO_2$ from the molten metallic phase by injecting air, which is preferably $O_2$ enriched, into the metallic phase at a temperature of 1000–1250° C., or preferably of 1000–1100° C. Pb can be removed from the molten metallic phase by contacting this phase with an acidic flux at a temperature of 1000–1300° C., or preferably of 1000–1150° C., whereby Pb is slagged off. In this way, the quantities of Se and Pb to be treated in the following steps of the process are decreased substantially. Se and Pb can be removed in either order.

When purified dry $AgNO_3$ is obtained in the process as described above, it can be commercialized as such. It also can be further processed to metallic Ag. To this end, the purified $AgNO_3$ is decomposed at a temperature above 400° C. into elemental Ag and nitrogen oxides ($NO_x$) which are scrubbed with $H_2O$ in an oxidizing atmosphere, thereby forming $HNO_3$, which is optionally recycled to the leaching step.

When the purified $AgNO_3$ solution is obtained in the process as described above, it can be commercialized as such. It also can be further processed to metallic Ag.

A first method is to hydrolyze the purified $AgNO_3$ solution with NaOH or KOH, thereby forming an $Ag_2O$ precipitate, which is separated by filtration and to decompose the $Ag_2O$ at a temperature above 300° C. into elemental Ag and $O_2$.

A second method is to react the purified $AgNO_3$ solution with HCl, thereby forming AgCl and $HNO_3$, which are separated by filtration, the $HNO_3$ being optionally recycled to the leaching step. The AgCl is then transformed to elemental Ag and NaCl either by reacting the AgCl with an NaOH solution in presence of a reducing agent, or by heating the AgCl with a soda flux above 1000° C.

The claimed process is well suited to refine raw silver, especially when high levels of Pb, Au, Cu and Pd are present. No nitrates are discharged in the environment. Au and PGM are readily separated and recovered from the Ag stream. The inventory of precious metals is thus much lower than with electrolytic refining.

The mandatory and the preferred working conditions of the new process are explained hereunder.

When Se is not removed before the molten metallic phase is granulated in water, it will concentrate in the Au bearing residue during the leaching of Ag with $HNO_3$. This will considerably complicate the refining of Au from the Au bearing residue.

During Se removal, the bath temperature should not exceed 1250° C. The higher the temperature, the lower the rate of Se removal. A temperature of up to 1100° C. is therefore preferred. The bath should in any case remain above 1000° C., i.e. well above the melting point of the raw silver. It is advisable to remove any slag from the surface of the metallic bath to enhance the volatilization rate of $SeO_2$.

During Pb removal, the bath temperature should not exceed 1300° C. With respect to refractory wear, a temperature of up to 1150° C. is preferred. The flux used for slagging off the Pb should be of the acidic type. An acidic flux is a flux comprising phoshates, silicates or borates as essential components. A flux consisting of $SiO_2$ and $Na_2B_4O_7.5aq$ in a weight ratio between 15:85 and 20:80 is recommended.

When leaching the Ag rich granules with $HNO_3$, a minimum temperature of 50° C. is needed. At a lower temperature, there is a risk for the leaching reaction to slow down or even to stop temporarily, and then to resume violently. Such unstable behavior is to be avoided for obvious safety reasons. Furthermore, it is recommended to raise the temperature gradually to at least 70° C. during leaching to obtain a residue which is as rich as possible in Au.

Preferably, the amount and concentration of $HNO_3$ are chosen so as to obtain an $AgNO_3$ solution with approximately 1000 g/l of Ag and a free $HNO_3$ concentration of 1.5 M. In this way, the volume of $AgNO_3$ solution to be processed is kept low, while crystallization of $AgNO_3$ is avoided as long as the solution is kept above 45° C.

During leaching, it is preferred to maintain an $O_2$ enriched atmosphere above the reaction mixture. To this end, the vessel might be of the closed type or of the pressurized type. An oxidizing atmosphere is indeed helpful to recycle $NO_x$, which are a byproduct of the leaching reaction, to $HNO_3$ in situ. The reactions are:

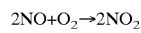

and

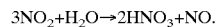

A high $O_2$ partial pressure is useful to enhance the reaction rates.

The purpose of the next operation is to separate the Cu, PGM, and the residual Pb from the Ag rich liquor. A heat treatment is applied whereby most impurities denitrate, i.e. their nitrate decomposes to oxide, forming an insoluble residue. In this step, the temperature of the $AgNO_3$ bearing melt should be kept between 220 and 350° C. A hold time of at least 15 minutes is needed to ensure a sufficient denitration level.

However, when Cu has to be removed down to 10 ppm or less as referenced to Ag, a higher minimal denitration temperature of 300° C. has to be maintained to fully decompose Cu nitrates.

There are two methods to separate the mixture of the purified $AgNO_3$ and the denitration residue.

The first method is the filtration of the mixture as a melt. The filtration has to be performed at a temperature of at least 220° C. so as to stay well above the solidification temperature of $AgNO_3$. Purified molten $AgNO_3$ is obtained.

The second method is to first react the mixture with water and then to filtrate the obtained slurry. For similar reasons as for those explained above for the $HNO_3$ leaching, the amount of water with which the mixture is reacted is determined so as to obtain a purified $AgNO_3$ solution with preferably about 1000 g/l of Ag.

Purified $AgNO_3$ or $AgNO_3$ solutions can be commercialized as such. However, if elemental Ag is needed, then the above process should be supplemented with a process for the transformation of purified $AgNO_3$ to Ag metal. To this end, any of the two methods described hereunder can be applied.

In a first method, the purified $AgNO_3$ is injected in a furnace where it is decomposed at a temperature above 400° C. The decomposition products are elementary Ag and $NO_x$. A scrubber converts the $NO_x$ to $HNO_3$ which can be reused in the leaching step. Any Ag compound present in the flue dust is also converted to $AgNO_3$ in the scrubber. The decomposition can be performed below or above the melting point of Ag. The latter case lends itself more easily to continuous processing of $AgNO_3$.

The above method will normally be applied directly on the purified molten $AgNO_3$; it is however also applicable to the purified $AgNO_3$ solutions in which case water is evaporated first.

A second method starts from the purified $AgNO_3$ solution. In a first step, an insoluble Ag compound such as $Ag_2O$ is precipitated, e.g. by hydrolysis of the $AgNO_3$ solution with KOH, or, preferably, with NaOH. In the latter case, the byproduct of the hydrolysis is an $NaNO_3$ solution. This $NaNO_3$ solution is relatively pure and can be transformed into solid $NaNO_3$ by a known drying or crystallization process. For example, by using fluid bed drying, granules of $NaNO_3$ are obtained which are similar in appearance and in composition to commercially available prills.

The $Ag_2O$ is optionally washed and is then thermally decomposed to Ag and $O_2$ at a temperature of at least 300° C. Sponge-like elemental Ag is obtained, which is re-melted and cast into ingots or granulated. If Pb has been removed to a large extent from the molten metallic silver bullion phase before leaching the Ag with $HNO_3$, then any traces of Pb which are still present in the sponge-like elemental Ag can be removed by natural volatilization during the re-melting and casting of Ag, or by absorption of Pb in a relatively small amount of silica-borax based flux. However, if Pb has not been removed from the molten metallic phase before the leaching step, then it can be removed from the molten Ag by blowing air, or by absorption in a relatively large amount of silica-borax based flux.

An alternative to the precipitation of $Ag_2O$ is the precipitation of a halide of Ag such as AgCl. This is done by reacting the purified $AgNO_3$ solution with HCl according to the reaction:

$AgNO_3 + HCl \rightarrow AgCl + HNO_3$.

Thereafter, two different reaction schemes are available to obtain elemental Ag. According to a first scheme, AgCl is transformed to metallic Ag by melting with a soda flux:

$2AgCl + Na_2CO_3 \rightarrow 2Ag + 2NaCl + CO_2 + 1/2O_2$.

According to a second scheme, an aqueous AgCl suspension is formed which is then reduced with $H_2$ to metallic Ag under addition of NaOH. The reaction is:

$AgCl + NaOH + \frac{1}{2}H_2 \rightarrow Ag + NaCl + H_2O$.

Both alternatives lead to the formation of NaCl, whether as an aqueous solution or as a solid, which normally can be discharged without harm.

Each essential step of the invention is further illustrated with an example.

DESCRIPTION OF EXAMPLES

Example 1

250 kg of silver bullion is melted and brought at a temperature of 1050° C. 550 l/hr air enriched with 220 l/hr $O_2$ is blown through the molten bath. Any slag which is formed during blowing is removed well before the slag completely covers the bath surface.

After 90 minutes of blowing, 10 kg flux consisting of 83 wt % $Na_2B_4O_7.5H_2O$ and 17 wt % $SiO_2$ is added and contacted for 20 minutes with the bath while maintaining the injection of 550 l/hr air and 220 l/hr $O_2$. After 20 minutes, the molten slag is drawn off. The addition of flux and the removal of molten slag after 20 minutes is repeated 2 more times while maintaining the same gas injection. The molten metal is then granulated in water at 50° C.

The composition of silver bullion and of the obtained Ag rich granules is reported in Table 1. This process proves to be capable to remove Pb and Se to below 15 ppm and 4 ppm respectively. Because traces of Pb and Se remaining in the Ag are also partially removed in the next operations of the process, a refined Ag containing typically 2 ppm Pb and <1 ppm Se can be expected.

TABLE 1

Removal of Pb and Se from the silver bullion (all concentrations in ppm)

|  | Pb | Se |
|---|---|---|
| Silver bullion | 578 | 52 |
| Ag rich granules | <15 | <4 |

Example 2

To 1 kg of Ag rich granules with a mean diameter of 4 mm, an amount of 0.91 of 60% $HNO_3$ solution is added at a flow rate of 0.45 l/h in a water cooled jacket reactor. During addition of the acid, the temperature of the mixture is maintained at 60° C. Pure $O_2$ is injected into the suspension at a flow rate of 40 g/h. An overpressure of 50 kPa in maintained. After addition of $HNO_3$, the temperature is raised to 80° C. Then, for 0.5 h, $O_2$ continues to be injected at a flow rate of 40 g/hr. The obtained mixture of Au bearing residue and of Ag rich liquor is separated by filtration. The residue is washed with 50 ml water and dried.

The compositions are shown in Table 2. It appears that the Au bearing residue has a very high Au content and that this residue tends to capture residual Se present in the Ag rich granules. No significant amount of Au is left in the Ag rich liquor.

TABLE 2

Separation of Au

|  | Ag | Au | Pt | Pd | Pb | Se |
|---|---|---|---|---|---|---|
| Ag rich granules | matrix | 1.4% | 1539 ppm | 4811 ppm | 12 ppm | 5 ppm |
| Au bearing residue | 7300 ppm | 98.9% | 1000 ppm | 476 ppm | <100 ppm | 147 ppm |
| Ag rich liquor | 1000 g/l | <0.2 mg/l | 1.7 g/l | 6.8 g/l | <0.1 g/l | <0.01 g/l |

Example 3

This example illustrates the effect of the denitration of the Ag rich liquor. In this case, the denitration residue is separated from the purified molten $AgNO_3$ by hot filtration.

270 kg of silver bullion is purified as described in Example 1. The obtained Ag rich granules are then leached under conditions as described in Example 2. The Ag rich liquor, at a concentration of 1000 g/l Ag, is first evaporated and then further heated to a melt at 350° C. for 2 h. Partial denitration of Pb and substantially complete denitration of Cu and PGM occurs at this temperature and the oxides of these metals form an insoluble denitration residue. Thereafter, the mixture of molten $AgNO_3$ and precipitated oxides is transferred to a pressure leaf filter equipped with a layered sintered stainless steel mesh with an absolute filter rating of 5 μm. The mixture is filtrated under a differential pressure of 6 bars, at a temperature of 280° C.

Table 3 shows the compositions. It is clear that the purified molten $AgNO_3$ is substantially free from PGM, Pb and Cu. These impurities are concentrated in the denitration residue.

TABLE 3

Removal of PGM, Pb and Cu after denitration by filtration of AgNO₃ in the molten state

| | Ag | Pt | Pd | Pb | Cu |
|---|---|---|---|---|---|
| Ag rich granules | matrix | 1410 ppm | 5175 ppm | 32 ppm | 3500 ppm |
| Ag rich liquor | 1000 g/l | 1.3 g/l | 5.1 g/l | 0.03 g/l | 3.5 g/l |
| Purified molten AgNO₃ | matrix | <0.3 ppm | 1.6 ppm | 9 ppm | <1 ppm |

Example 4

This example illustrates the effect of the denitration of the Ag rich liquor. In this case the denitration residue is separated from the purified AgNO₃ by aqueous filtration.

270 kg of silver bullion is purified as described in Example 1. The obtained Ag rich granules are then leached under conditions as described in Example 2. The Ag rich liquor, at a concentration of 1090 g/l Ag, is first evaporated and then further heated to a melt at 350° C. for 1 h. Partial denitration of Pb and substantially complete denitration of Cu and PGM occurs at this temperature and the oxides of these metals form an insoluble denitration residue. Thereafter the mixture of molten AgNO₃ and precipitated oxides is transferred at a controlled rate of 30 kg per minute to an agitated vessel containing 160 l of water. During the transfer of the mixture, cooling water is circulated through the vessel jacket limiting the temperature to 80° C. After settling of the oxides, the clear fraction of the solution is drawn off from the vessel and filtrated through a cartridge filter with an absolute rating of 5 μm. The settled slurry is filtrated separately on a pressure leaf filter with a woven multi-filament filter medium. Both filtrates are combined, forming the purified AgNO₃ solution.

Table 4 shows the compositions. It is clear that the purified AgNO₃ solution is substantially free from PGM, Pb and Cu. These impurities are concentrated in the denitration residue.

TABLE 4

Removal of PGM, Pb and Cu after denitration by filtration of AgNO₃ in aqueous solution

| | Ag | Pt | Pd | Pb | Cu |
|---|---|---|---|---|---|
| Ag rich granules | matrix | 570 ppm | 5100 ppm | 15 ppm | 2370 ppm |
| Ag rich liquor | 1090 g/l | 0.6 g/l | 5.5 g/l | 0.02 g/l | 2.6 g/l |
| Purified AgNO₃ solution | 1000 g/l | <0.4 mg/l | 0.2 mg/l | 4.4 mg/l | 3 mg/l |

Example 5

Table 5 illustrates the typical level of purity obtained by the process according to the invention compared to the level obtained by a state of the art electrorefining process.

TABLE 5

Comparison of the purity of elemental Ag (all concentrations in ppm)

| Process | Au | Pt | Pd | Pb | Cu |
|---|---|---|---|---|---|
| Electrorefining | <30 | <3 | <30 | <10 | <30 |
| According to the invention | <2 | <2 | <3 | <10 | <10 |

What is claimed is:

1. A process for refining impure silver bullion containing metals from the group consisting of Pb, Se, Cu, Au and platinum group metals as impurities, comprising:
   leaching the silver bullion with HNO₃ at a temperature above 50° C., followed by filtration, thereby separating a Au bearing residue from an Ag rich liquor;
   heating the Ag rich liquor, thereby evaporating H₂O and forming an AgNO₃ bearing melt;
   maintaining the AgNO₃ bearing melt at a temperature of 300–350° C. for at least 15 minutes, thereby forming a mixture of a purified AgNO₃ and a denitration residue containing essentially all the Cu and platinum group metals as oxides; and
   separating the purified AgNO₃ from the denitration residue.

2. The process according to claim 1, wherein said leaching the silver bullion takes place in an O₂ enriched atmosphere.

3. The process according to claim 1, wherein said separating the purified AgNO₃ from the denitration residue involves filtrating the mixture at a temperature above 220° C., thereby obtaining purified molten AgNO₃.

4. The process according to claim 1, wherein said separating the purified AgNO₃ from the denitration residue involves reacting the mixture with water, followed by filtration, thereby obtaining a purified AgNO₃ solution.

5. The process according to claim 1, wherein the leaching is preceded by:
   heating the silver bullion, thereby forming a molten metallic phase; and
   granulating the molten metallic phase in water, thereby forming Ag righ granules;
   and wherein the leaching is performed on the Ag righ granules.

6. The process according to claim 5, including removing Se as gaseous SeO2 from the molten metallic phase by injecting air into the metallic phase at a temperature of 1000–1250° C.

7. The process according to claim 6, wherein the air injected is O₂ enriched.

8. The process according to claim 6, wherein the metallic phase is at a temperature of 1000–1100° C.

9. The process according to claim 5, including contacting the molten metallic phase with an acidic flux at a temperature of 1000–1300° C., and slagging off Pb from the molten metallic phase.

10. The process according to claim 9, wherein the molten metallic phase is at a temperature of 1000–1150° C.

11. The process according to claim 1, wherein the purified molten AgNO₃ is further processed to elemental Ag by:
    decomposing the purified molten AgNO₃ at a temperature above 400° C. into purified Ag and NO$_x$; and
    scrubbing the NO$_x$ with H₂O in an exiting atmosphere, thereby forming HNO₃.

12. The process according to claim 11, including recycling the HNO₃ for use in said leaching.

13. The process according to claim 1, wherein a purified $AgNO_3$ solution is obtained from said separations, and wherein said purified $AgNO_3$ solution is further processed to elemental Ag by hydrolyzing the purified $AgNO_3$ solution with NaOH or KOH, thereby forming a $Ag_2O$ precipitate, which is separated by filtration, and decomposing the $Ag_2O$ at a temperature above 300° C. into elemental Ag and $O_2$.

14. The process according to claim 1, wherein a purified $AgNO_3$ solution is obtained from said separating, and wherein said purified $AgNO_3$ solution is further processed to elemental Ag by:

reacting the purified $AgNO_3$ solution with HCl, thereby forming AgCl and $HNO_3$, which are separated by filtration, and transforming the AgCl to elemental Ag and NaCl by one of reacting the AgCl with an NaOH solution in presence of a reducing agent, and heating the AgCl with a soda flux above 1000° C.

15. The process according to claim 14, further comprising recycling the $HNO_3$ formed by said reacting and separation by filtration, to said leaching.

* * * * *